(12) United States Patent
Chandra et al.

(10) Patent No.: US 10,098,069 B2
(45) Date of Patent: Oct. 9, 2018

(54) DETERMINING CAUSE OF ENERGY SPIKE USING ENERGY REPORTS

(71) Applicant: Microsoft Corporation, Redmond, WA (US)

(72) Inventors: Ranveer Chandra, Bellevue, WA (US); Omid Fatemieh, Bellevue, WA (US); Parya Moinzadeh, Bellevue, WA (US); Chandramohan A. Thekkath, Palo Alto, CA (US); Yinglian Xie, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 746 days.

(21) Appl. No.: 14/174,796

(22) Filed: Feb. 6, 2014

(65) Prior Publication Data
US 2015/0223172 A1 Aug. 6, 2015

(51) Int. Cl.
*H04B 17/00* (2015.01)
*H04W 52/02* (2009.01)
*H04W 4/20* (2018.01)

(52) U.S. Cl.
CPC ......... *H04W 52/0264* (2013.01); *H04W 4/20* (2013.01); *Y02D 70/00* (2018.01); *Y02D 70/142* (2018.01); *Y02D 70/144* (2018.01); *Y02D 70/164* (2018.01); *Y02D 70/26* (2018.01)

(58) Field of Classification Search
USPC .............. 455/574, 343.1–343.6, 67.11, 67.7, 455/575.2–575.4
See application file for complete search history.

(56) References Cited

U.S. PATENT DOCUMENTS 8,089,368 B2 * 1/2012 Hong ................. G01R 31/3606
   320/132
8,265,712 B2 * 9/2012 Pernu .................... H04W 88/06
   370/311

(Continued)

OTHER PUBLICATIONS

Oliner, et al., "Carat: Collaborative Energy Diagnosis for Mobile Devices", In Technical Report No. UCB/EECS-2013-17, Mar. 8, 2013, 16 pages.

(Continued)

*Primary Examiner* — Edward Urban
*Assistant Examiner* — Rui Hu
(74) *Attorney, Agent, or Firm* — Holzer Patel Drennan

(57) ABSTRACT

Mobile devices periodically send resource usage reports to an energy server. The reports include information such as an amount of energy used during a time interval, and identify processes that are executed on the mobile devices during the time interval. These reports are analyzed by the energy server and are used to generate statistics regarding the energy used by the mobile devices and the processes that are executed by the mobile devices. When a mobile device experiences a suspected energy spike, the mobile device generates and sends a report to the energy server. After confirming the energy spike, the energy server uses the statistics and the received report to identify one or more causes of the energy spike. The causes can include one or more processes, or the mobile device itself. The mobile device can reduce the amount of energy used based on the identified causes.

13 Claims, 9 Drawing Sheets

(56) References Cited

U.S. PATENT DOCUMENTS

| | | | | |
|---|---|---|---|---|
| 8,280,456 | B2* | 10/2012 | Hackborn | G06F 11/3409 455/574 |
| 8,452,352 | B2 | 5/2013 | Kothari et al. | |
| 8,538,484 | B2* | 9/2013 | Chan | G06F 1/28 455/566 |
| 8,681,671 | B1* | 3/2014 | Hui | H04W 52/0225 370/311 |
| 8,989,910 | B1* | 3/2015 | Klots | G06Q 50/06 700/291 |
| 9,400,541 | B2* | 7/2016 | Zimmermann | H04W 52/0254 |
| 2005/0027466 | A1* | 2/2005 | Steinmetz | G06F 11/3013 702/63 |
| 2006/0036675 | A1 | 2/2006 | Crichlow et al. | |
| 2010/0001870 | A1* | 1/2010 | Hong | G01R 31/3606 340/636.1 |
| 2011/0040990 | A1* | 2/2011 | Chan | G06F 1/28 713/300 |
| 2013/0157677 | A1* | 6/2013 | Liao | H04W 52/0212 455/452.1 |
| 2014/0024416 | A1* | 1/2014 | Xie | H04W 52/0261 455/574 |
| 2014/0045436 | A1* | 2/2014 | Gutierrez, Jr. | H04M 1/72522 455/67.11 |
| 2014/0187177 | A1* | 7/2014 | Sridhara | H04B 17/391 455/73 |

OTHER PUBLICATIONS

Chandra, et al., "E-Loupe: End-to-End Energy Management for Mobile Devices", In Technical Report MSR-TR-2013-69, Jul. 19, 2013, 2 pages.
Hao, et al., "Estimating Mobile Application Energy Consumption using Program Analysis", In 35th International Conference on Software Engineering, May 18, 2013, pp. 90-99.
Gupta, Satish Chandra, "Mobile App Energy Profiler", Retrieved on: Feb. 4, 2014, Available at: http://www.satishchandragupta.com/projects/mobile-app-energy-profiler-wp8-w8/.
Rumble, et al., "Apprehending Joule Thieves with Cinder", In Proceedings of 1st ACM SIGCOMM Workshop on Networking, Systems, and Applications for Mobile Handhelds, Aug. 17, 2009, 6 pages.
Zhang, et al., "ADEL: An Automatic Detector of Energy Leaks for Smartphone Applications", In Proceedings of 10th International Conference on Hardware/Software Codesign and System Synthesis, Oct. 7, 2012, 10 pages.
Pathak, et al., "Fine-Grained Power Modeling for Smartphones Using System Call Tracing", In Proceedings of 6th European Conference on Computer Systems, Apr. 10, 2011, 15 pages.
Pathak, et al., "What is keeping my phone awake? Characterizing and Detecting No-Sleep Energy Bugs in Smartphone Apps", In Proceedings of 10th International Conference on Mobile Systems, Applications, and Services, Jun. 25, 2012, pp. 267-280.
Sankaran, et al., "Energy Modeling for Mobile Devices using Performance Counters", In IEEE 56th International Midwest Symposium on Circuits and Systems, Aug. 4, 2013, 4 pages.
"Android Developer: Processes and Threads", Retrieved on: Feb. 4, 2014, Available at: http://developer.android.com/.
"Design. Code. Build. Innovate", Retrieved on: Feb. 4, 2014, Available at: http://developer.apple.com/.
"Introduction to Background Tasks", Retrieved on: Feb. 4, 2014, Available at: http://go.microsoft.com/fwlink/?LinkID=227329&clcid=0x409.
Kameka, Andrew, "Google Blames Android Battery Woes on user Practices and Poorly-Designed Apps", Published on: May 19, 2010, Available at: http://androinica.com/2010/05/google-blames-android-battery-woes-on-user-practices-and-poorly-designed-apps/.
Sage, Simon, "Intomobile: Motorola Says Android Apps Negatively Affecting Device Performance ", Published on: Jun. 3, 2011, Available at: http://www.intomobile.com/2011/06/03/motorola-says-android-apps-negatively-affecting-device-performance/.
"Betterbatterystats", Retrieved on: Feb. 4, 2014, Available at: https://play.google.com/store/.
"Qualcomm Developer Network: Trepn Proler" Retrieved on: Feb. 4, 2014, Available at: https://developer.qualcomm.com/mobile-development/increase-app-performance/trepn-profiler.
Balasubramanian, et al., "Energy Consumption in Mobile Phones: a Measurement Study and Implications for Network Applications", In Proceedings of the 9th ACM SIGCOMM Conference on Internet Measurement Conference, Nov. 4, 2009, pp. 280-293.
Cuervo, et al., "MAUI: Making Smartphones Last Longer with Code Offload", In Proceedings of the 8th International Conference on Mobile Systems, Applications, and Services, Jun. 15, 2010, 14 pages.
Dong, et al., "Chameleon: A Color-Adaptive Web Browser for Mobile OLED Displays", In Proceedings of the 9th International Conference on Mobile Systems, Applications, and Services, Jun. 28, 2011, pp. 85-98.
Fonseca, et al., "Quanto: Tracking Energy in Networked Embedded Systems", In Proceedings of the 8th USENIX Conference on Operating Systems Design and Implementation, Dec. 8, 2008, 16 pages.
Kansal, et al., "Fine-Grained Energy Profiling for Power-Aware Application Design", In Proceedings of First Workshop on Hot Topics in Measurement and Modeling of Computer Systems, Jun. 6, 2008, 5 pages.
Mittal, et ., "Empowering Developers to Estimate App Energy Consumption", In Proceedings of the 18th Annual International Conference on Mobile Computing and Networking, Aug. 22, 2012, 11 pages.
Oliner, et al., "Collaborative Energy Debugging for Mobile Devices", In Proceedings of the Eighth USENIX Conference on Hot Topics in System Dependability, Oct. 7, 2012, 6 pages.
Pathak, et al., "Bootstrapping Energy Debugging on Smartphones: a First Look at Energy Bugs in Mobile Devices", In Proceedings of the 10th ACM Workshop on Hot Topics in Networks, Nov. 14, 2011, 6 pages.
Pathak, et al., "Where is the Energy Spent Inside my App? Fine Grained Energy Accounting on Smartphones with Eprof ", In Proceedings of the 7th ACM European Conference on Computer Systems, Apr. 10, 2012, 14 pages.
Qian, et al., "Profiling Resource usage for Mobile Applications: a Cross-Layer Approach", In Proceedings of the 9th International Conference on Mobile Systems, Applications, and Services, Jun. 28, 2011, 14 pages.
Roy, et al., "Energy Management in Mobile Devices with the Cinder Operating System" In Proceedings of the Sixth Conference on Computer Systems, Apr. 10, 2011, pp. 139-152.
Wasserman, Larry, "All of Statistics: A Concise Course in Statistical Inference", Published on: Oct. 21, 2004, Available at: http://www.ic.unicamp.br/~wainer/cursos/1s2013/ml/livro.pdf.
Zhang, et al., "Accurate Online Power Estimation and Automatic Battery Behavior based Power Model Generation for Smartphones", In Proceedings of the Eighth IEEE/ACM/IFIP International Conference on Hardware/Software Codesign and System Synthesis, Oct. 24, 2010, 10 pages.

* cited by examiner

DETERMINING CAUSE OF ENERGY SPIKE USING ENERGY REPORTS

BACKGROUND

Mobile devices such as phones and tablets are becoming the computing device of choice for users. Typically these mobile devices execute a variety of applications. Many of these applications are sophisticated and make demands on the host device's resources. One such resource is the energy in the mobile device battery, which unlike its personal computer counterpart, is often limited.

Previously, energy management in mobile devices has focused on energy savings at the lowest level of the mobile device (e.g., the radio or processor). However, these efforts provide only limited help to application developers in making their applications more energy efficient, or to users who may wish to avoid energy-hungry applications.

Estimating the energy usage of an application by executing it in isolation and measuring its energy usage does not work well. For example, the amount of energy a particular application uses may vary due to user settings such as how often the application is configured to check for updates, or the size of a user's contacts file. Therefore, determining the typical expected energy usage of an application may be difficult in isolation.

SUMMARY

Mobile devices periodically send resource usage reports to an energy server. The reports include information such as an amount of energy used during a time interval, and the reports identify processes that are executed on the mobile devices during the time interval. These reports are analyzed by the energy server and are used to generate statistics regarding the energy used by the mobile devices and the processes that are executed by the mobile devices. When a mobile device experiences an energy spike, the mobile device generates and sends a report to the energy server. The energy server uses the statistics and the received report to identify one or more causes of the energy spike. The causes can include one or more processes, or the mobile device itself. The mobile device can reduce the amount of energy used based on the identified causes.

In an implementation, a resource usage report is received by a computing device from a mobile device. The resource usage report is associated with a time interval and the mobile device. The resource usage report indicates an amount of energy used by the mobile device during the time interval and that an energy spike has occurred. In response to the resource usage report, a cause of the energy spike is determined based on the received resource usage report. The determined cause is provided to the mobile device by the computing device.

In an implementation, whether an energy spike occurred is determined by a mobile device. In response to determining the energy spike occurred, resource usage data is collected by the mobile device over a time interval. The collected resource usage data is sent to an energy server by the mobile device. In response to the sending, an indication of a cause of the energy spike is received by the mobile device from the energy server. One or more actions are performed by the mobile device based on the indicated cause.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
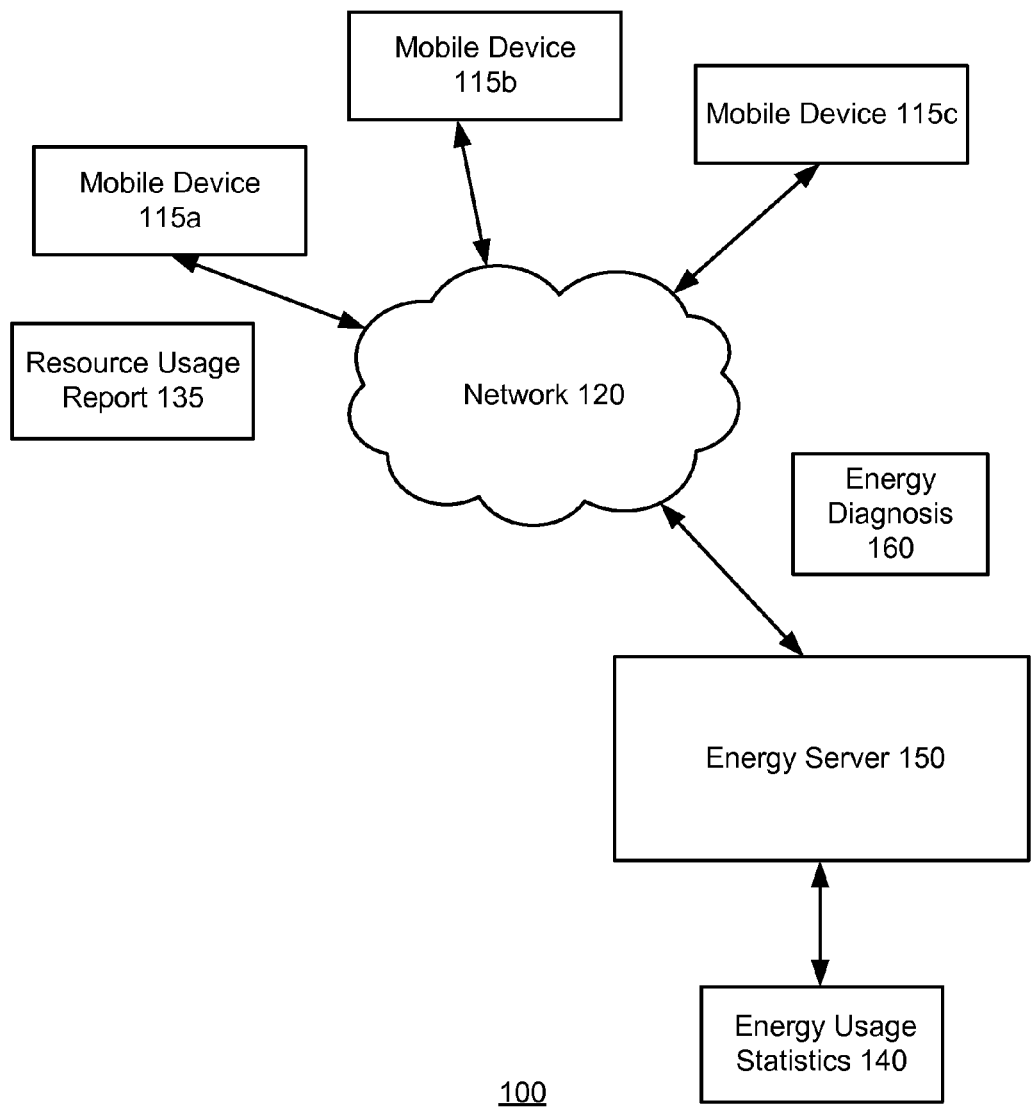
FIG. 1 is an illustration of an example environment for providing energy management of mobile devices.

FIG. 1 is an illustration of an example environment 100 for providing energy management of mobile devices. As illustrated, the environment 100 includes mobile device 115a, mobile device 115b, and mobile device 115c (collectively referred to herein as mobile devices 115), and an energy server 150 in communication with each other through a network 120. The network 120 may be a variety of network types including the public switched telephone network (PSTN), a cellular telephone network, and a packet switched network (e.g., the Internet or a cloud network). The mobile devices 115 and the energy server 150 may be implemented using one or more general purpose computing devices such as the computing device 900 described with respect to FIG. 9, for example. Moreover, while three mobile devices 115 and one energy server 150 are shown in FIG. 1, it is for illustrative purposes only; there is no limit to the number of mobile devices 115 and/or energy servers 150 that may be supported.

Each of the mobile devices 115 may be a computing device such as a cellular phone, tablet computer, or any other type of computing device, for example. As may be appreciated, power and energy management may be a feature for mobile devices 115 that often rely on battery power. One such way to provide energy management on a mobile device 115 is to identify the source of an energy spike. An energy spike may be an unusually large energy drain or energy usage rate experienced by a mobile device 115. By identifying and possibly eliminating the source of such energy spikes, the battery performance of the mobile device 115 can be increased.

Accordingly, and as described further herein, the energy server 150 identifies the causes of an energy spike experienced by at least one of the mobile devices 115, and provides an energy diagnosis 160 to that mobile device that may be used by the mobile device to eliminate or mitigate the energy spike. Moreover, because the energy spike causes are diagnosed remotely by the energy server 150 and not at the mobile devices 115 themselves, the user experience of the mobile devices 115 is not hindered by the computational resources used to identify the causes of the energy spikes. In addition, the energy server 150 can aggregate the information learned from each of the mobile devices 115 to provide energy spike prevention across all of the mobile devices 115.

In some implementations, each of the mobile devices 115 may periodically generate what is referred to herein as a resource usage report 135. The generated resource usage reports 135 may be sent to the energy server 150. A generated resource usage report 135 may include a variety of information about the resources being used by a particular mobile device for a specified time interval. Depending on the implementations, the resource usage report 135 may include, for example, an identifier of the mobile device that generated the report, a timestamp that identifies an end time of the time interval, identifiers of one or more processes and applications that were active on the mobile device during the time interval, energy used by the mobile device during the time interval, processor cycles used by the mobile device during the time interval, a number of disk accesses made by the mobile device during the time interval, and a number of bytes sent and received by the mobile device during the time interval. Other information may also be included in the resource usage report 135.

To ensure the privacy of the users associated with mobile devices 115, in some implementations, the resource usage reports 135 may only be provided to the energy server 150 if the user associated with the mobile device opts in or otherwise consents to providing the data. Alternatively or additionally, the data in the resource usage report 135 may be altered or modified prior to being sent or stored so that the identity of the user associated with the resource usage report 135 cannot be identified.

The energy server 150 may receive the resource usage reports 135 from the mobile devices 115. The energy server 150 may statistically analyze the reports 135 to create a statistical model that may be used to determine if a particular mobile device is experiencing an energy spike based on a resource usage report 135 generated by that mobile device. The statistical model and/or the received resource usage reports 135 may be stored by the energy server 150 as energy usage statistics 140. For example, the energy server 150 may use the received resource usage reports 135 to generate a normal distribution of energy usage for the mobile devices 115. If the energy usage for a particular one of the mobile devices 115 falls outside of the generated normal distribution, then the energy server 150 may determine that the resource usage report 135 indicates that the mobile device may be experiencing an energy spike. Otherwise, the energy server 150 may determine that the resource usage report 135 indicates no energy spike.

In some implementations, where an energy spike is detected based on a resource usage report 135, the energy server 150 may use the received resource usage report 135 and the energy usage statistics 140 to generate an energy diagnosis 160. As described further with respect to FIG. 3 for example, the energy diagnosis 160 may indicate whether or not a mobile device is experiencing an energy spike, and if so, which process or groups of processes may be responsible for the energy spike. In addition, the energy diagnosis 160 may further indicate that an energy spike is caused by issues specific to the mobile device, or by interactions between the mobile device and one or more processes executing on that mobile device.

The generated energy diagnosis 160 may be received by a mobile device. Where the energy diagnosis 160 indicates that an energy spike is occurring, the mobile device may use the diagnosis 160 to determine how to eliminate or mitigate the energy spike. For example, where the energy diagnosis 160 indicates that a particular process or group of processes are causing the spike, the mobile device may reduce an amount of mobile device resources allotted to the processes, or may kill or cancel some or all of the processes. The particular actions taken by the mobile device may depend on the energy diagnosis 160, a power state of the mobile device (e.g., whether the mobile device is in a standby state or is being actively used), as well as a mobile device specific power model. The energy model and the mobile device are described further with respect to FIG. 2, for example.

Figure 2:
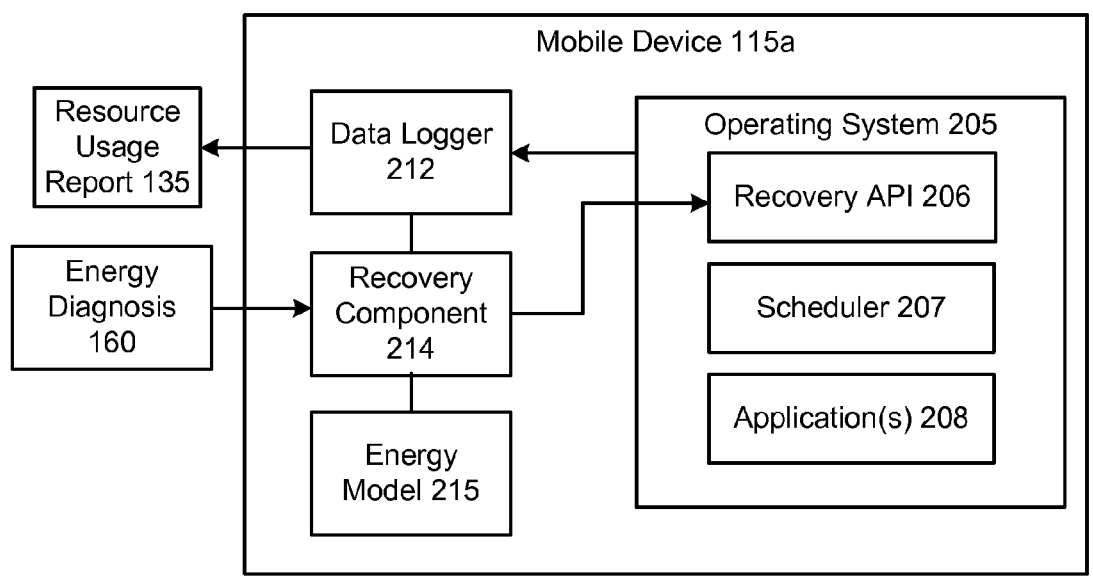
FIG. 2 is an illustration of an example mobile device.

FIG. 2 is an illustration of an example mobile device 115a, such as one of the mobile devices 115. As shown, the mobile device 115a includes a variety of components including, but not limited to a data logger 212, a recovery component 214, an operating system 205, a recovery application programming interface (API) 206, a scheduler 207, one or more applications 208, and an energy model 215. More or fewer components may be supported by the mobile device 115a. The mobile device 115a may be a cellular phone, laptop, tablet computer, personal media player, or a portable videogame system. Other types of computers may be used.

The data logger 212 may generate the resource usage report 135. The resource usage report 135 may be associated with an interval of time. The interval of time may be a variety of lengths of time including one minute, five minutes, ten minutes, etc. Other lengths of time may be supported. The length of time selected for the interval may be selected by a user or an administrator, for example, and may be selected based on a variety of factors including whether or not the mobile device 115a is connected to the network 120 using Wi-Fi or a cellular connection (e.g., using Wi-Fi may avoid data charges associated with cellular connections and therefore a shorter interval may be used), the amount of storage available on the mobile device 115a (e.g., longer intervals may use more storage), and the amount of available battery power (e.g., a shorter interval may include more frequent resource usage reports 135 and therefore may use more energy). Other factors may be considered when selecting the time interval such as processing and/or storage capacity of the energy server 150 and user consent to the monitoring.

The resource usage report 135 may include a variety of metrics and information regarding the utilization of resources by the mobile device 115a during the interval. In some implementations, the resource usage report 135 may include a list of some or all of the processes executing on the mobile device 115a during the interval. The processes may be processes associated with the applications 208 executing on the mobile device 115a, as well as processes associated with the operating system 205. As may be appreciated, only identifying the applications 208, or processes directly associated with the applications 208, executing on the mobile device 115a may not be sufficient to determine the energy usage of the various applications 208. In some implementations, worker processes of the operating system 205 are used to by the applications 208 to perform various tasks or to access resources of the mobile device 115a such as sensors (e.g., GPS). Therefore, processes associated with both the applications 208 and the operating system 205 may be included in the report 135.

The data logger 212 may determine the list of processes that are active during the interval using a set of system functions made available by the operating system 205. Other methods may be used.

The resource usage report 135 may comprise an indication of an amount of energy used by the mobile device 115a during the interval. In some implementations, the energy may be determined by the data logger 212 by polling a battery associated with the mobile device 115a at the beginning of the interval for an amount of energy remaining in the battery, and similarly polling the battery at the end of the interval. The difference between the energy readings at the beginning and ending of the interval may be included in the resource usage report 135 as the energy used by the mobile device 115a. Alternatively, for example, the resource usage report 135 may include an energy usage rate which may be calculated by dividing the energy used during the interval by the length of the interval.

The resource usage report 135 may further include a measure of the processor cycles used by each process of the mobile device 115a. The processor cycles may include both foreground and background processor cycles. The number of processor cycles may be determined by the data logger 212 using the set of system functions made available by the operating system 205.

The resource usage report 135 may include a measure of the number of disk accesses made be each process during the interval. The disk accesses may include reads, writes, and flushes, for example. The disk accesses may include accesses to system memory associated with the mobile device 115a, as well as external disks such as secure digital cards associated with the mobile device 115a. Process accesses to any type of disk associated with the mobile device 115a may be included in the resource usage report 135. The number of disk accesses may be determined by the data logger 212 using the set of system functions made available by the operating system 205.

The resource usage report 135 may include a measure of the number of network accesses may be each process during the interval. The network accesses may include the number of bytes sent and received by each process during the interval for each type of network interface supported by the mobile device 115a. The network interfaces may include Wi-Fi, cellular, Bluetooth, and USB, for example. Other types of proprietary and non-proprietary network interfaces may be supported. The network accesses may be determined by the data logger 212 using the set of system functions made available by the operating system 205.

In some implementations, the data logger 212 may generate two types of resource usage reports 135; a "long" resource usage report 135; and a "short" resource usage report 135. The long resource usage report 135 may be generated by the data logger 212 using long time intervals such as every ten minutes. The long resource usage reports 135 may be routinely generated by the data logger 212 and provided to the energy server 150 for purposes of statistical analysis by the energy server 150. Depending on the implementation, the generated long resource usage reports 135 may be sent to the energy server 150 when they are generated, or may be batched together and sent periodically or at predetermined times or intervals. For example, the long resource usage reports 135 generated by the data logger 212 over a day may be sent to the energy server 150 at the end of the day. Alternatively or additionally, whatever long resource usage reports 135 that have been generated by the data logger 212 may be sent when the mobile device 115 is charging or otherwise not using battery power, or when the mobile device 115a is connected to a Wi-Fi network or otherwise not using a cellular network interface, depending on the implementation.

The short resource usage reports 135 may be generated by the data logger 212 when an energy condition is detected by the data logger 212. The short resource usage reports 135 may be generated and sent to the energy server 150 for determining whether an energy spike is occurring or has occurred. In some implementations, an energy condition may be when the data logger 212 detects an energy usage rate for an interval that exceeds a threshold energy usage rate. For example, the threshold rate may be 0.4 Watts. However, any threshold energy usage rate may be selected.

The short resource usage reports 135 generated when the energy condition is met may be smaller than the long resource usage reports 135. For example, a short resource usage report 135 may be less than two minutes whereas a long resource usage report 135 may be greater than ten minutes. Because the short resource usage report 135 is for purposes of energy spike diagnosis, a narrower set of data that is proximate to when the possible energy spike is occurring may be more useful than a wider set of data that may include data that less relevant to the cause or causes of the energy spike.

Figure 3:
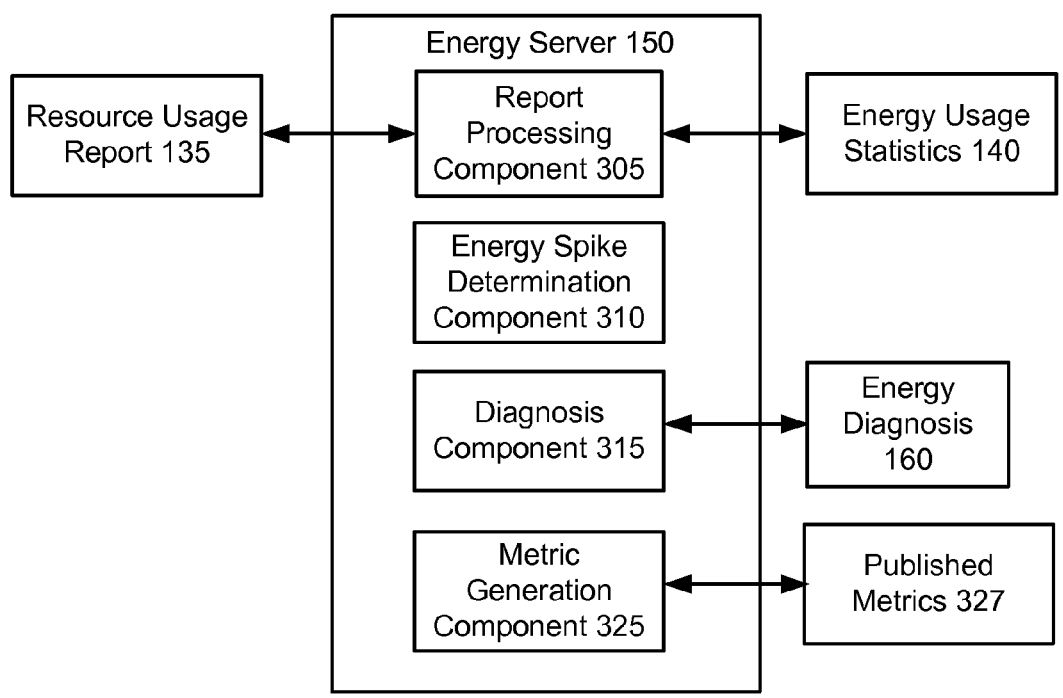
FIG. 3 is an illustration of an example energy server.

Turning now to FIG. 3, the energy server 150 receives resource usage reports 135 (both short and long) from the mobile devices 115. As shown, the energy server 150 comprises a variety of components including, but not limited to, a report processing component 305, an energy spike determination component 310, a diagnosis component 315, and a metric generation component 325. More or fewer components may be supported by the energy server 150.

The report processing component 305 may receive the resource usage reports 135 and may store data from those reports in the energy usage statistics 140. In addition, the report processing component 305 may analyze the resource usage reports 135 to generate energy usage distributions. In some implementations, the report processing component 305 may use a normal distribution to approximate the energy usage distribution of the mobile devices 115 using information included the in the received resource usage reports 135. The distributions may be computed in accordance with the central limit theorem in some implementations. However, other statistical methods may be used.

Depending on the implementation, a global energy usage distribution may be determined based on the resource usage reports 135 received from the mobile devices 115. In addition, where enough resource usage reports 135 have been received, mobile device specific energy usage distributions may be determined for particular ones of the mobile devices 115. Similarly, model specific energy usage distributions may also be determined. The energy usage distributions may be stored by the report processing component 305 with the energy usage statistics 140.

The energy spike determination component 310 may determine if an energy usage rate determined from a received resource usage report 135 indicates that the sending mobile device experienced an energy spike. Alternatively, the short resource usage reports 135 may be assumed to indicate an energy spike by the energy server 150. The energy spike determination component 310 may make the determination using the determined energy usage distributions (either the global distribution or the device specific distribution when available).

In some implementations, the energy spike determination component 310 may determine if an energy usage rate indicated by a resource usage report 135 is associated with an energy spike using the energy usage distribution $N(\mu, \sigma^2)$ where $\mu$ and $\sigma$ are determined from the energy usage statistics 140. The energy spike determination component 310 may determine a probability that the energy usage rate comes from $N(\mu, \sigma^2)$. If the determined probability is less than a threshold, then the energy spike determination component 310 may determine that the energy usage rate is associated with an energy spike. The threshold probability may be 0.05, in some implementations. However, higher or lower thresholds may be used. Alternatively, the energy spike determination component 310 may determine that the energy usage rate indicates an energy spike if the energy usage rate is more than some number of standard deviations (e.g., 2) outside of $N(\mu, \sigma^2)$.

The diagnosis component 315 may attempt to diagnose a cause of the energy spike for those resource usage reports 135 determined to be associated with an energy spike. The diagnosis component 315 may diagnose the cause of the energy spike using the energy usage statistics 140 collected from the received resource usage reports 135.

In some implementations, the diagnosis component 315 may classify the cause of the energy spike into one of a number of predetermined categories. These categories may include process related, device related, process and device related, or other. More or fewer categories may be used. The classification of the energy spikes into one of the number of predetermined categories is described below.

For process related classification, the diagnosis component 315 may attempt to determine if a process or a group of processes, executed by one of the mobile devices 115 during the interval associated with the resource usage report 135 is a likely cause of the energy spike. Depending on the implementation, the diagnosis component 315 may consider ordinary and worker processes. Ordinary processes are associated with applications 208, and worker processes are the processes that are started by the ordinary process and are often shared by multiple applications 208. Thus, to associate energy usage with any particular ordinary process, the energy used by the worker processes may also be considered. In some implementations, the system processes associated with the operating system 205 may not be considered by the diagnosis component 315.

In some implementations, the diagnosis component 315 may, for each ordinary and worker process j identified in the resource usage report 135 associated with the energy spike, divide the stored resource usage reports 135 stored in the energy usage statistics 140 into two classes: one with reports 135 that include the process j (denoted by $D_j$), and one with reports 135 that do not include the process j (denoted by $D_{\bar{j}}$). The diagnosis component 315 may calculate two energy distributions $N_j(\mu_1, \sigma_1^2)$ and $N_{\bar{j}}(\mu_2, \sigma_2^2)$ to approximate $D_j$ and $D_{\bar{j}}$, and may estimate the means and variances of the distributions from the energy usage statistics 140.

The diagnosis component 315 may determine whether $D_j$ and $D_{\bar{j}}$ are different, and if so, that the process j is a possible source of the energy spike. In some implementations, the diagnosis component 315 may determine the distributions are different by using Student's t-test to determine whether $D_j$ and $D_{\bar{j}}$, with unequal sizes and unequal variances are drawn from the same distribution with a 95% confidence error bound. If the two distributions different and $\mu_1 - \mu_2 \geq \emptyset$ then the diagnosis component 315 may determine that the process j is a possible source of the energy spike. The threshold $\emptyset$ may be set by a user or administrator, for example, based on a predetermined or selected granularity. An example value for $\emptyset$ is 10% of the mean energy usage rate of the mobile devices 115.

After some or all of the processes in the resource usage report 135 have been considered, the diagnosis component 310 may have determined one or more processes that may be the cause of the energy spike. For the determined one or more processes that are ordinary or non-worker processes, no further action may be taken by the diagnosis component 315 with respect to these processes. Because the ordinary processes are directly associated with one or more applications 208, knowing that an ordinary process is a likely cause of the energy spike also implicates the associated application 208 as a likely cause of the energy spike.

For the determined one or more processes that are worker processes, the diagnosis component 315 may further determine which ordinary processes that the worker processes are working for. As described above, ordinary processes that are associated with applications 208 often invoke worker processes to perform work on their behalf. Thus, to determine which application 208 is the cause of an energy spike, the diagnosis component 315 may also determine which ordinary processes that the determined worker processes are likely working for.

In some implementations, the diagnosis component 315 may, for each worker process w determined to be a likely cause of the energy spike, infer which ordinary process that the process W is working for using a co-occurrence heuristic. If both the worker process W and the ordinary process j are identified together frequently in received resource usage reports 135, then it is likely that that the worker process W works on behalf of the ordinary process j.

In some implementations, the diagnosis component 315 may apply the co-occurrence heuristic to the process w by determining a count of how many times that each ordinary process in the resource usage report 135 associated with the energy spike co-occurs with the process W in a previously received report 135 in the energy usage statistics 140. The determined count for each ordinary process may be used to generate a probability for each ordinary process that represents the probability of the ordinary process j occurring in the same resource usage report 135 as the process w. The ordinary process that has the highest determined probability may be selected by the diagnosis component 315 as a likely cause of the energy spike. Alternatively or additionally, only ordinary processes with a determined probability that is greater than a threshold probability may be selected by the diagnosis component 315 as a likely cause of the energy spike. The threshold probability may be 0.95, for example, in some implementations. Other threshold probabilities may be selected or used.

As may be appreciated, depending on the number of resource usage reports 135 stored in the energy usage statistics 140, determining the probabilities of each ordinary process with respect to each determined worker process may take a large amount of computational resources. Therefore, in some implementations, the diagnosis component 315 may periodically (and/or at some other interval(s) of time) determine the probabilities for one or more worker process and ordinary process combinations in the background. Alternatively or additionally, determined probabilities for worker and ordinary process combinations may be cached for later use after being determined by the diagnosis component 315.

If no process (ordinary or worker) is identified by the diagnosis component 315 as being the source of the energy spike, the diagnosis component 315 may attempt to identify process pairs (j, k) whose interaction may be the source of the energy spike. Similarly as described for single processes, the diagnosis component 315 may divide the resource usage reports 135 stored in the energy usage statistics 140 into two classes: one with resource usage reports 135 that include both the process j and the process k (denoted by $D_{jk}$), and one with resource usage reports 135 that do not include both the process j and the process k together (denoted by $D_{\overline{jk}}$).

Similarly as described above for single processes, the diagnosis component 315 may determine whether $D_{jk}$ and $D_{\overline{jk}}$ are different, and if so, that the processes j and k together are a possible source of the energy spike. In some implementations, the diagnosis component 315 may determine the distributions are different by using Student's t-test. If the two distributions different, then the diagnosis component 315 may determine that the processes j and k together are a possible source of the energy spike.

Depending on the implementation, if no process pairs (j, k) are determined to be the source of the energy spike, then the diagnosis component 315 may similarly consider process triplets, quads, etc.

In addition to processes, the diagnosis component 315 may also attempt to determine if the mobile device that originated the resource usage report 135 associated with the energy spike is the cause or source of the energy spike. If the mobile device is the source of the energy spike, then there may be many other resource usage reports 135 received from the mobile device that also show high energy usage for a particular interval. Accordingly, in some implementations, the diagnosis component 315 may determine the energy usage distribution $N_d(\mu_d, \sigma_d^2)$ for the mobile device. If the energy usage rate that was determined to be associated with the energy spike is just a normal variation (i.e., within one or two standard deviations) that fits into $N_d(\mu_d, \sigma_d^2)$ for the mobile device, then the diagnosis component 315 may determine that the energy spike may be caused by a device specific issue. A device specific issue may include the malfunctioning of a component of the mobile device such as the battery, screen, or processor. Other device issues may be included.

The diagnosis component 315 may further determine if an energy spike is caused by a process device interaction. In some cases, a particular process may not consume much energy, but because of misconfigurations or usage patterns, may become energy hungry when running on a particular mobile device. Accordingly, the diagnosis component 315 may determine if there are any mobile device and process combinations that may be the source of the energy spike.

In some implementations, the diagnosis component 315 may determine the process device interactions similarly as described above for single processes. However, rather than calculating $D_j$ and $D_{\overline{j}}$ using all resource usage reports 135 stored in the energy usage statistics 140, the diagnosis component 315 may calculate $D_j$ and $D_{\overline{j}}$ using just the stored resource usage reports 135 that were received from the mobile device. The processes that are likely to have caused the energy spike may be identified using the Student t-test as described above. The diagnosis component 315 may similarly consider pairs of processes limited to resource usage reports 135 provided by the particular mobile device.

Depending on the implementation, when looking for process and mobile device interactions, the diagnosis component 315 may consider only non-system processes identified in the resource usage report 135 associated with the energy spike that have not already been determined to be a likely cause of the energy spike. Alternatively, all processes in the resource usage report 135 associated with the energy spike may be determined.

In some implementations, if no cause of the energy spike is determined, the diagnosis component 315 may classify the cause of the energy spike as other. For example, the energy spike may have been caused by a large number of concurrent processes executing on the mobile device.

After determining one or more causes of the energy spike, the diagnosis component 315 may generate an energy diagnosis 160. The energy diagnosis 160 may then be sent to the mobile device that provided the resource usage report 135 that indicated the energy spike. The energy diagnosis 160 may include identifiers of any processes, process pairs, or groups of processes, determined to be a cause of the energy spike, as well as any device issues or process and device interactions that may have been determined to be a cause of the energy spike.

The metric generation component 325 may generate one or more energy metrics with respect to one or more applications 208 and the processes associated with the applications 208. In some implementations, the metrics may include a consumed power metric and an occurrence frequency metric. Other metrics may be supported.

The consumed power metric for a process may be an indication of how much power a mobile device consumes when that process is active. The consumed power metric may be calculated by determining the stored resource usage reports 135 that include the process, and determining the average amount of energy consumed as indicated by the determined resource usage reports 135. The occurrence frequency may indicate how often a particular process is active when installed. The occurrence frequency may similarly be determined using the stored resource usage reports 135 that include the process.

The metric generation component 325 may publish the determined metrics as the published metrics 327. The metrics for a process may be published alongside the application 208 associated with the process in a marketplace or other community where users are able to select and download applications 208 to their mobile devices 115. The consumed power metric may give users a relative idea of how much energy the associated application 208 is likely to draw. The occurrence frequency metric may give users an idea of how often the associated application is likely to run in the background when installed.

Together, the metrics may allow users to consider power consumption when choosing applications 208 for their mobile devices 115. Currently, the information regarding applications 208 available on most marketplaces are limited to price, size, and user ratings. Such metrics may incentivize application 208 programmers to make more energy efficient applications 208.

Returning to FIG. 2, the recovery component 214 may receive the energy diagnosis 160 and may determine how to correct the energy spike based on the energy diagnosis 160. In one implementation, where the diagnosis 160 identifies one or more processes as the likely cause of the energy spike, the recovery component 214 may limit the resources available to one or more of the identified processes. For example, one or more of the processes may be limited to at most ten seconds of processor time in a fifteen minute interval, or one or more of processes may be limited to one MB of data downloads in a ten minute interval. The recovery component 214 may limit the resources available to a process or processes using the recovery API 206 which may in turn interact with the scheduler 207 to schedule the execution of the one or more processes, for example. Other methods for controlling the resources that are available to one or more processes may be used.

In some implementations, to better determine how to recover from energy spikes using an energy diagnosis 160, the recovery component 214 may use and/or build an energy model 215. The energy model 215 may be used to determine the amount of energy used over a given interval of time that may be attributable to processes and the amount of energy that may be attributable to other aspects of the mobile device such as network interfaces and disk accesses. In some implementations, the energy model 215 may be determined on per mobile device basis using controlled experiments. Alternatively, the energy model 215 may be generated by the recovery component 214 using the information from the resource usage reports 135 generated by the data logger 212.

In some implementations, the energy model 215 may be based on equation 1, where E is the amount of energy used during an interval, $E_l$ is the energy that a mobile device uses in a lowest power state and $E_r$ is the energy used by active computation during the interval:

$$E = E_l + E_r \quad (1)$$

$E_l$ may be determined using equation 2, where $P_l$ is the power floor for the mobile device 115 and $\Delta t_l$ is the time that the mobile device is in the low power state during the interval:

$$E_l = P_l * \Delta t_l \quad (2)$$

$E_r$ may be determined using equation 3, where $\Delta t_r$ is the time that the mobile device is processing during the interval, cpu is the number of processor cycles of the mobile device, disk is the number of disk accesses, network is the number of bytes sent and received using the various network interfaces, and a, b, c, and d are variables:

$$E_r = (\Delta t_r * a) + (b * \text{cpu}) + (c * \text{disk}) + (d * \text{network}) \quad (3)$$

The recovery component 214 may use the generated resource usage reports to determine the values of a, b, c, and d for the energy model described by equations 1-3. In some implementations, the recovery component 214 may estimate $P_l$ based on resource usage reports 135 where no processor cycles are being used. The values for a, b, c, and d may be determined by the recovery component 214 using linear regression, for example. Other methods may be used.

The recovery component 214 may use equation 3 to determine which action or combinations of actions to take to reduce the amount of energy used by the mobile device. For example, the recovery component 214 may use equation 3 to determine a combination of processor cycles (cpu), disk accesses (disk), and network access (network) reductions that may be used to reduce the energy used by the mobile device to a certain $E_r$.

In some implementations, where the energy diagnosis 160 indicates mobile device specific energy spike causes, the recovery component 214 may reduce the energy used by the mobile device by slowing the frequency of operating system 205 timers. Reducing the frequency of the timers may reduce the frequency with which the operating system 205 wakes up to service processes, thereby increasing the time that the mobile device remains in a low power state. To determine the optimal new frequency for the operating system 205 timers, the recovery component 214 may use equation 3, in an implementation. Other methods may be used.

Figure 4:
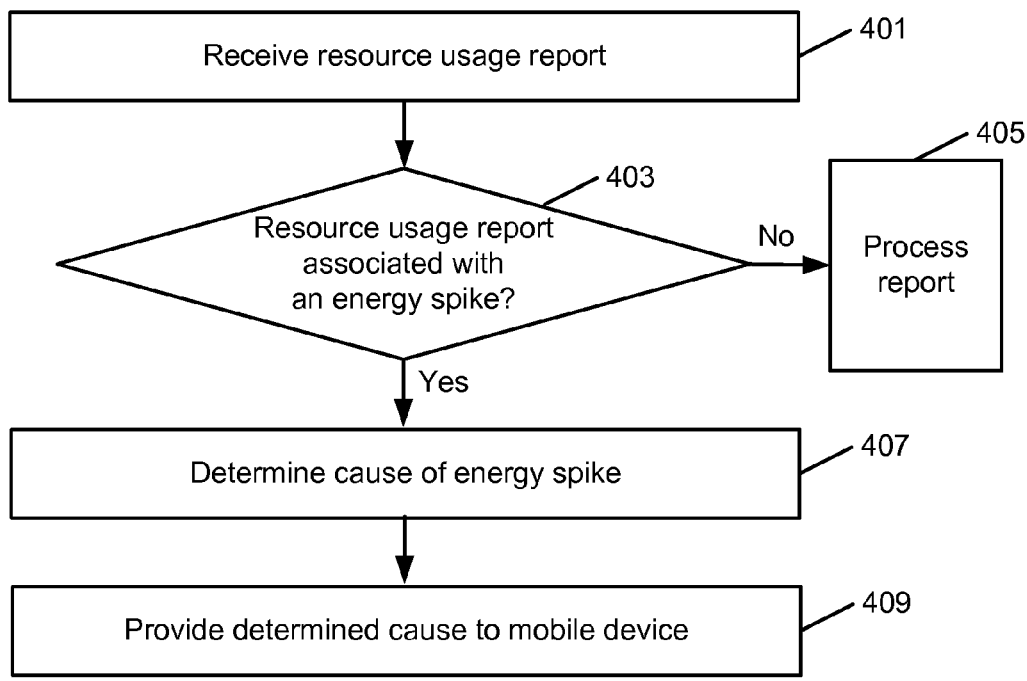
FIG. 4 is an illustration of an implementation of an exemplary method for determining a cause of an energy spike.

FIG. 4 is an illustration of an implementation of an exemplary method 400 for determining a cause of an energy spike. The method 400 may be implemented by the energy server 150, in an implementation. A resource usage report is received at 401. The resource usage report 135 may be received from a mobile device 115. The resource usage report 135 may indicate an amount of energy used by the mobile device 115 during an interval of time. The resource usage report 135 may indicate the processes that were executed by the mobile device 115 during the interval and other data such as network, disk, and processor resources used during the interval. The mobile device 115 may be a cellular phone or tablet computer, for example.

A determination is made as to whether the resource usage report is associated with an energy spike at 403. The determination may be made by the energy spike determination component 310 of the energy server 150. Depending on the implementations, the resource usage report 135 may be a short resource usage report 135 that was generated by a mobile device 115 upon detecting an energy spike. In those implementations, any received short resource usage reports are taken to be associated with an energy spike by the energy server 150.

In other implementations, the energy server 150 may determine that the resource usage report is associated with an energy spike by determining if the energy usage rate indicated by the resource usage report 135 is outside of a normal energy usage rate distribution. The normal energy rate distribution may have been determined by the energy server 150 based on previously received resource usage reports 135 from other mobile devices 115.

If it is determined that resource usage report 135 is associated with an energy spike, then the method 400 may continue at 407; otherwise, the method 400 may continue at 405.

The received resource usage report is processed at 405. The received resource usage report 135 may be processed by the report processing component 305 of the energy server 150. In some implementations, the report processing component 305 may process the resource usage report 135 by adding it to the energy usage statistics 140.

The cause of the energy spike is determined at 407. The cause of the energy spike may be determined by the diagnosis component 315 of the energy server 150. In some implementations, the cause of the energy spike may be determined using stored resource usage reports 135 in the energy usage statistics 140 and the received resource usage report 135. The cause may be one or more processes identified by the received resource usage report 135, or a combination of the one or more processes identified by the received resource usage report 135. Alternatively, the cause may be the mobile device that sent the resource usage report 135, or some combination of processes and the mobile device.

The determined cause is provided to the mobile device at 409. The determined cause may be provided by the diagnosis component 315 of the energy server 150 as the energy diagnosis 160. The mobile device may use the provided diagnosis 160 to stop or reduce the energy spike.

Figure 5:
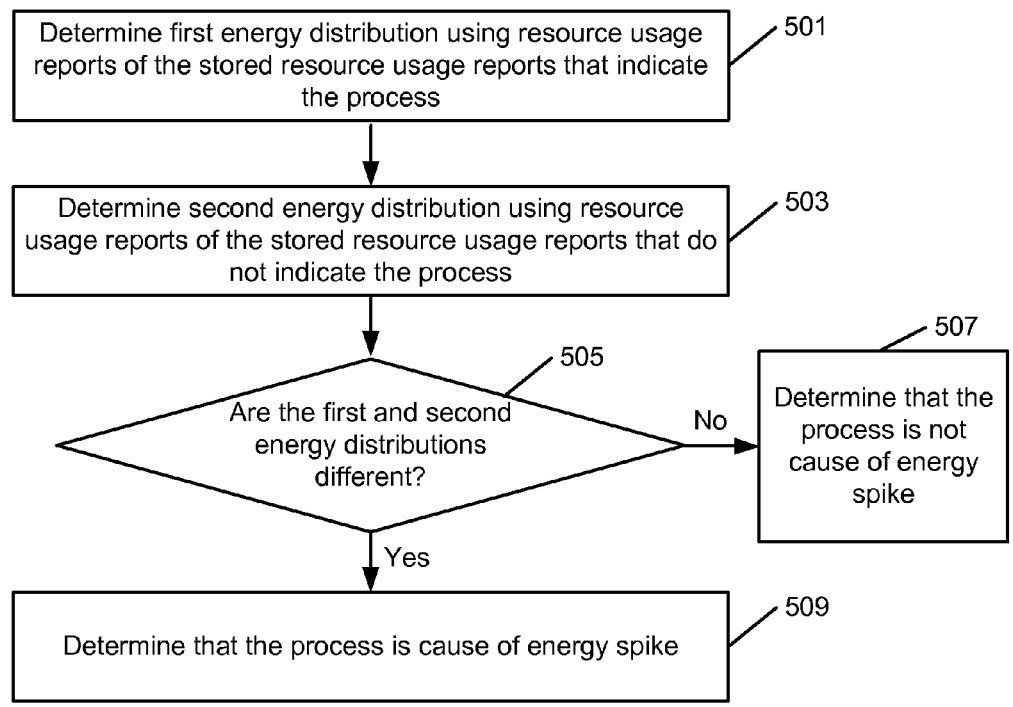
FIG. 5 is an illustration of an implementation of an exemplary method for determining whether a process is a cause of an energy spike.

FIG. 5 is an illustration of an implementation of an exemplary method 500 for determining whether a process is a cause of an energy spike. The method 500 may be implemented by the diagnosis component 315 of the energy server 150. The method 500 may be applied to each process identified in a received resource usage report 135 received from a mobile device 115.

A first energy distribution of resource usage reports that indicate the process is determined 501. The first energy distribution may be determined by the diagnosis component 315 of the energy server 150. The first energy distribution may be a normal distribution. In some implementations, the first energy distribution may be determined using the amounts of energy indicated by each of the stored resource usage reports 135 that also indicate the process.

A second energy distribution of resource usage reports that do not indicate the process is determined 503. The second energy distribution may be determined by the diagnosis component 315 of the energy server 150. The second distribution may be a normal distribution. In some implementations, the second energy distribution may be determined using the amounts of energy indicated by each of the stored resource usage reports 135 that do not indicate the process.

A determination of whether the first and the second energy distributions are different is made at 505. The determination may be made by the diagnosis component 315 of the energy server 150. In some implementations, the first and second energy distributions are different when a difference between the means of each distribution exceeds a threshold. Other methods for comparing energy distributions may be used. If the energy distributions are not different then the method 500 may end at 507 where the process is determined to not be the cause of the energy spike. Otherwise, the method 500 may continue at 509.

That the process is the cause of the energy spike is determined at 509. The process may be determined by the diagnosis component 315 of the energy server 150. The process may be identified to the mobile device that provided the resource usage report 135 as the energy diagnosis 160.

Figure 6:
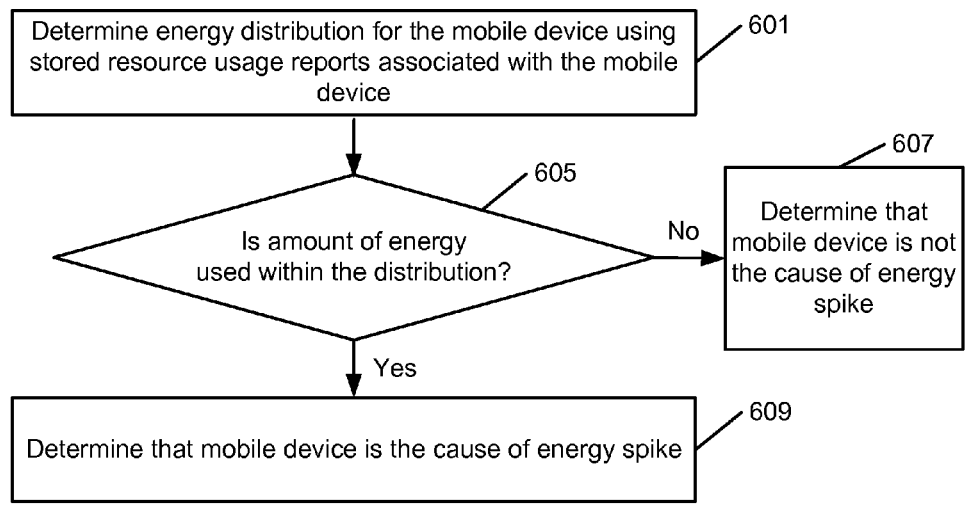
FIG. 6 is an illustration of an implementation of a method for determining whether a device is a cause of an energy spike.

FIG. 6 is an illustration of an implementation of a method 600 for determining whether a device is a cause of an energy spike. The method 600 may be implemented by the diagnosis component 315 of the energy server 150. An energy distribution for the mobile device is determined at 601. The distribution may be a normal distribution and may be determined from the amounts of energy indicated by the stored resource usage reports 135 that are also associated with the mobile device 115.

A determination of whether an amount of energy indicated in a received resource usage report associated with the mobile device is within the energy distribution at 605. The determination may be made by the diagnosis component 315 of the energy server 150. The amount of energy may be within the energy distribution if it is within up to two standard deviations of the energy distribution, for example. Other standards for determining of the amount of energy is within the energy distribution may be used.

If the amount of energy is not within the distribution, then the method 600 may determine that the device is not the cause of the energy spike at 607. Otherwise, the method 600 may continue at 609.

That the device is the cause of the energy spike is determined at 609. The mobile device 115 may be determined by the diagnosis component 315 of the energy server 150. The mobile device 115 may be identified as the cause in the energy diagnosis 160.

Figure 7:
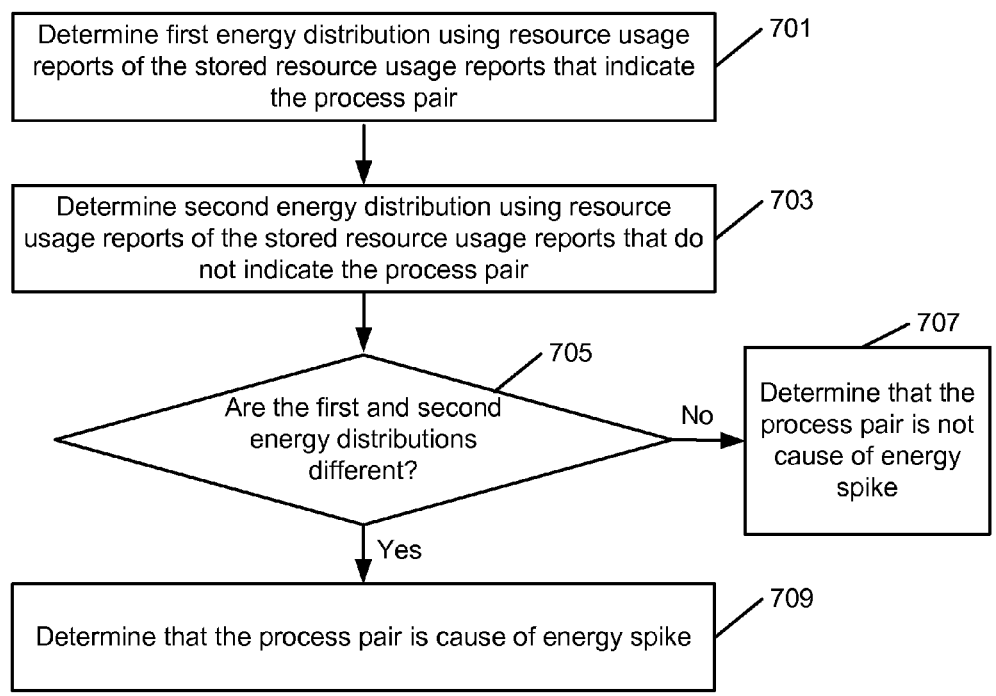
FIG. 7 is an illustration of an implementation of an exemplary method for determining whether a pair of processes is a cause of an energy spike.

FIG. 7 is an illustration of an implementation of an exemplary method 700 for determining whether a pair of processes is a cause of an energy spike. The method 700 may be implemented by the diagnosis component 315 of the energy server 150. The method 700 may be applied to each pair of processes identified in a received resource usage report 135 received from a mobile device 115. In some implementations, at least one process in the pair of processes is an ordinary process.

A first energy distribution of resource usage reports that indicate the process pair is determined 701. The first energy distribution may be determined by the diagnosis component 315 of the energy server 150. In some implementations, the first energy distribution may be determined using the amounts of energy indicated by each of the stored resource usage reports 135 that also indicate the process pair.

A second energy distribution of resource usage reports that do not indicate the process pair is determined 703. The second energy distribution may be determined by the diagnosis component 315 of the energy server 150. In some implementations, the second energy distribution may be determined using the amounts of energy indicated by each of the stored resource usage reports 135 that do not indicate the process pair.

A determination of whether the first and the second energy distributions are different is made at 705. The determination may be made by the diagnosis component 315 of the energy server 150. If the energy distributions are not different then the method 700 may end at 707 where the process pair is determined to not be the cause of the energy spike. Otherwise, the method 700 may continue at 709.

That the process pair is the cause of the energy spike is determined at 709. The process pair may be determined by the diagnosis component 315 of the energy server 150. The process pair may be identified to the mobile device 115 that provided the resource usage report 135 as the energy diagnosis 160.

Figure 8:
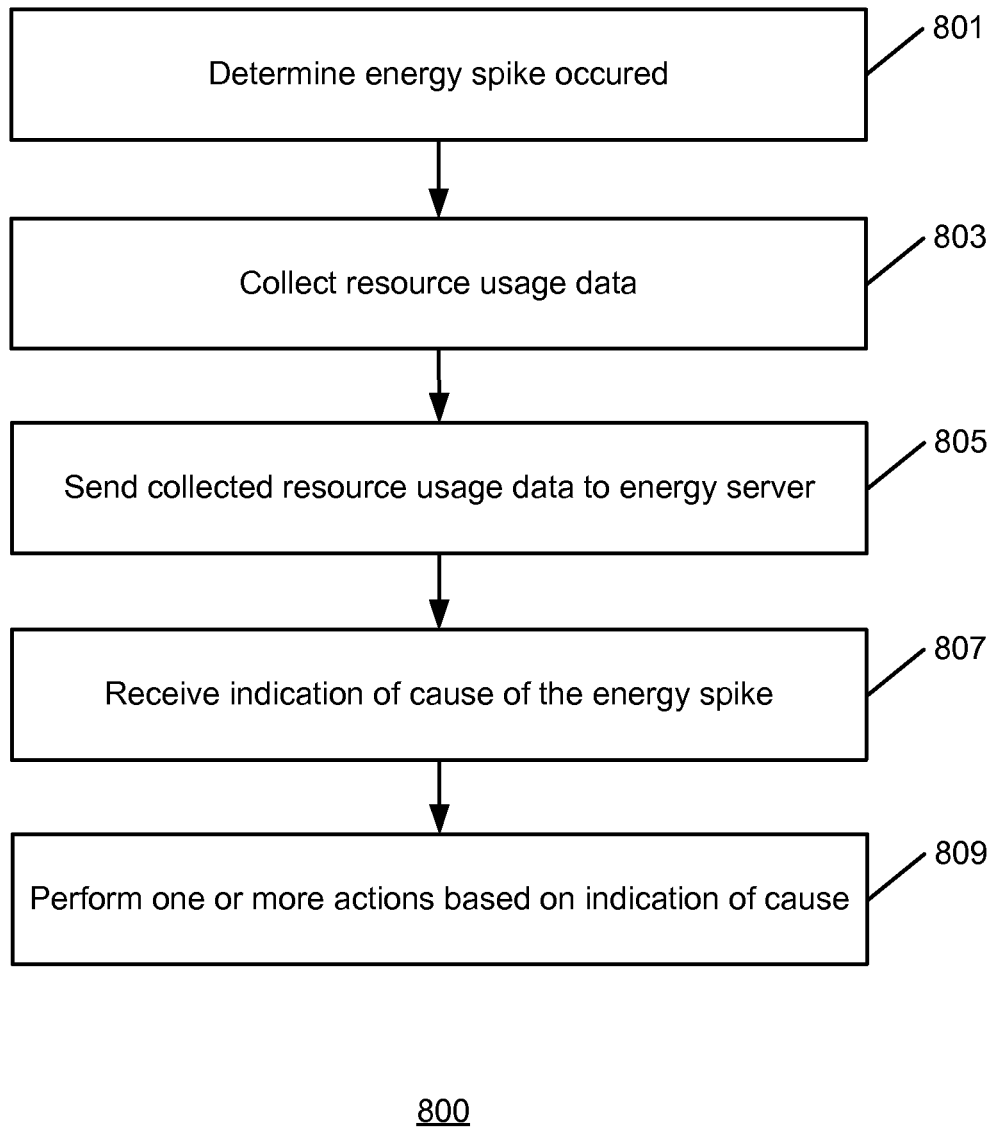
FIG. 8 is an illustration of an implementation of an exemplary method for determining whether an energy spike occurred and performing one or more actions to end the energy spike.

FIG. 8 is an illustration of an implementation of an exemplary method 800 for determining whether an energy spike occurred and performing one or more actions to end the energy spike. The method 800 may be implemented by a mobile device, such as one of the mobile devices 115. A determination that an energy spike occurred is made at 801. The determination may be made by the data logger 212 of the mobile device. In some implementations, the determination may be made when an energy drain associated with a battery of the mobile device exceeds a threshold rate.

Resource usage data is collected at 803. The resource usage data may be collected by the data logger 212 of the mobile device, for example. The resource usage data may be associated with an interval and may include an amount of energy used by the mobile device during the interval and indicators of one or more processes that were active on the mobile device during the interval. The resource usage data may further include indications of processing, disk, and network resources used by the mobile device during the interval.

The collected resource data is sent at 805. The collected resource usage data may be sent to the energy server 150 by the data logger 212 of the mobile device as the resource usage report 135. An indication of a cause of the energy spike is received at 807. The indication of the cause may be received from the energy server 150 as the energy diagnosis 160. The indicated cause may be one or more processes, or combinations of processes, executing on the mobile device. Other causes may include mobile device specific causes, for example.

One or more actions are performed based on the indicated cause at 809. The one or more actions may be performed by the recovery component 214 of the mobile device. The one or more actions may include reducing resources available to one or more processes that were indicated as causes in the energy diagnosis 160 or reducing one or more operating system 205 timers, for example.

Figure 9:
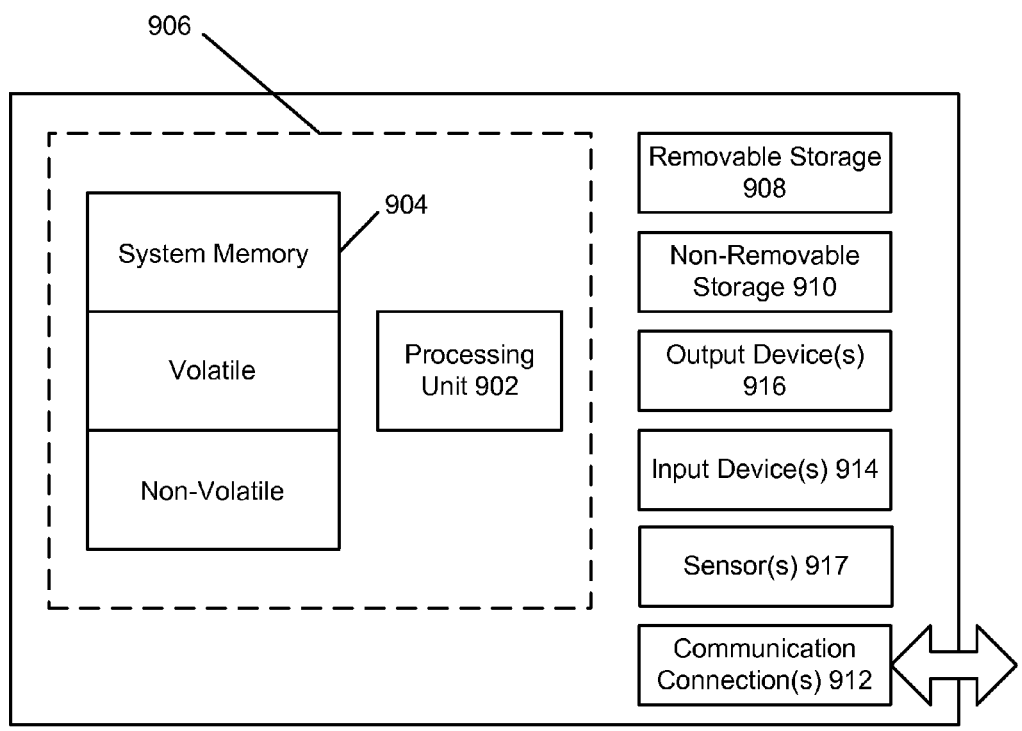
FIG. 9 is an illustration of an exemplary computing environment in which example embodiments and aspects may be implemented.

FIG. 9 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, wearable devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. Computing device 900 depicts the components of a basic computer system providing the execution platform for certain software-based functionality in accordance with various embodiments. Computing device 900 can be an environment upon which a client side library, cluster wide service, and/or distributed execution engine (or their components) from various embodiments is instantiated. Computing device 900 can include, for example, a desktop computer system, laptop computer system or server computer system. Similarly, computing device 900 can be implemented as a handheld device (e.g., cellphone, smart phone, tablet etc.). Computing device 900 typically includes at least some form of computer readable media. Computer readable media can be a number of different types of available media that can be accessed by computing device 900 and can include, but is not limited to, computer storage media.

In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, hard disks, and SD cards. Such additional storage is illustrated in FIG. 9 by removable storage 908 and non-removable storage 910.

Computing device 900 typically includes a variety of computer readable media. Computer readable media can be any available media that can be accessed by device 900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communications connection(s) 912 that allow the device to communicate with other devices and/or networks. The connections 912 may include Wi-Fi, cellular, Bluetooth, CDMA, GSM, etc. Computing device 900 may also have input device(s) 914 such as a keyboard, capacitive display, pen, voice input device, touch input device, etc. Output device(s) 916 such as a capacitive display, speakers, etc. may also be included. Computing device 900 may also receive data from one or more sensors 917. The sensor(s) 917 such accelerometers, global positioning systems, proximity sensors, gyroscopes, etc. All these devices and sensors are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a resource usage report by a computing device from a mobile device, wherein the resource usage report is associated with a time interval and the mobile device, and the resource usage report indicates an amount of energy used by the mobile device during the time interval;

determining that the resource usage report indicates an energy spike by the computing device;

in response to determining that the resource usage report indicates an energy spike, determining a cause of the energy spike based on the received resource usage report by the computing device;

classifying the determined cause of the energy spike as process related in response to determining that a process is the determined cause of the energy spike;

classifying the determined cause of the energy spike as device related in response to determining that the mobile device is the determined cause of the energy spike;

classifying the determined cause of the energy spike as process and device related in response to determining that an interaction between the process and the mobile device is the determined cause of the energy spike;

generating an energy diagnosis that includes a category in which the determined cause is classified, the determined cause, and a plurality of metrics; and providing the energy diagnosis to the mobile device by the computing device.

2. The method of claim 1, wherein the received resource usage report further indicates one or more processes that were active on the associated mobile device during the time interval, and wherein determining the cause of the energy spike based on the received resource usage report comprises determining at least one process of the one or more processes that were active on the associated mobile device as the cause of the energy spike.

3. The method of claim 1, further comprising storing a plurality of resource usage reports received from a plurality of mobile devices, and wherein determining the cause of the energy spike based on the received resource usage report comprises determining the cause of the energy spike based on the received resource usage report and the stored plurality of resource usage reports.

4. The method of claim 3, wherein each resource usage report further indicates a plurality of processes that were active on the mobile device associated with the resource usage report during the time interval, and determining the cause of the energy spike based on the received resource usage report and the stored plurality of resource usage reports comprises, for each process indicated by the received resource usage report:

determining a first energy distribution using resource usage reports of the stored plurality of resource usage reports that indicate the process;

determining a second energy distribution using resource usage reports of the stored plurality of resource usage reports that do not indicate the process;

determining that the first and the second energy distributions are different; and in response to the determination, determining that the process is the cause of the energy spike.

5. The method of claim 3, wherein each resource usage report further indicates a plurality of processes that were active on the mobile device associated with the resource usage report during the time interval, and determining the cause of the energy spike based on the received resource usage report and the stored plurality of resource usage reports comprises, for each process indicated by the received resource usage report:

determining a first energy distribution using resource usage reports of the stored plurality of resource usage reports that indicate the process and are associated with the mobile device;

determining a second energy distribution using resource usage reports of the stored plurality of resource usage reports that do not indicate the process and are associated with the mobile device;

determining that the first and the second energy distributions are different; and in response to the determination, determining that the process and the mobile device are the cause of the energy spike.

6. The method of claim 3, wherein determining the cause of the energy spike based on the received resource usage report and the stored plurality of resource usage reports comprises:

determining an energy distribution for the mobile device using the stored plurality of resource usage reports associated with the mobile device;

determining if the amount of energy indicated by the received resource usage report is within the determined distribution; and in response to determining that the amount of energy indicated by the received resource usage report is within the determined distribution, determining that the mobile device is the cause of the energy spike.

7. The method of claim 1, wherein the mobile device comprises one or more of a mobile phone, a laptop, a tablet computer, a personal media device, a wearable device, or a videogame device.

8. The method of claim 1, wherein each resource usage report further indicates processor cycles using by the mobile device during the time interval, a number of disk accesses made by the mobile device during the time interval, and a number of bytes sent and received by the mobile device during the time interval.

9. A system comprising:

a plurality of mobile devices, wherein each mobile device is adapted to generate a plurality of resource usage reports; and an energy server adapted to:

receive the generated plurality of resource usage reports;

store the received generated plurality of resource usage reports;

receive a resource usage report from a mobile device of the plurality of mobile devices, wherein the received resource usage report is not one of the received generated plurality of resource usage reports and the received resource usage report is associated with an energy spike;

determine a cause of the energy spike based on the received resource usage report and the stored plurality of resource usage reports;

classify the determined cause of the energy spike as process related in response to determining that a process is the determined cause of the energy spike;

classify the determined cause of the energy spike as device related in response to determining that the mobile device is the determined cause of the energy spike;

classify the determined cause of the energy spike as process and device related in response to determining that an interaction between the process and the mobile device is the determined cause of the energy spike;

generate an energy diagnosis that includes a category in which the determined cause is classified, the determined cause, and a plurality of metrics; and provide the energy diagnosis to the mobile device that the resource usage report was received from.

10. The system of claim 9, wherein each resource usage reports further indicates one or more processes that were active on the mobile device that generated the resource usage report and an amount of energy used during a time interval, and wherein the energy server is adapted to determine at least one process of the one or more processes that were indicated by the received resource usage report as the cause of the energy spike.

11. The system of claim 10, wherein each resource usage report further indicates processor cycles used by the mobile device that generated the resource usage report during the time interval, a number of disk accesses made by the mobile device during the time interval, and a number of bytes sent and received by the mobile device during the time interval.

12. The system of claim 9, wherein each mobile device comprises one or more of a mobile phone, a laptop, a tablet computer, a personal media device, or a videogame device.

13. The system of claim 9, wherein each mobile device of the plurality of mobile devices is adapted to detect an energy spike occurrence, and in response to the detected energy spike occurrence, generate a resource usage report.

* * * * *